May 26, 1931. J. W. FORREST 1,806,621

OPTICAL SYSTEM FOR COLORIMETERS AND THE LIKE

Filed Sept. 2, 1927

John W. Forrest.
INVENTOR his ATTORNEYS

Patented May 26, 1931

1,806,621

UNITED STATES PATENT OFFICE

JOHN W. FORREST, OF BRIGHTON, NEW YORK, ASSIGNOR TO BAUSCH & LOMB OPTICAL COMPANY, OF ROCHESTER, NEW YORK, A CORPORATION OF NEW YORK

OPTICAL SYSTEM FOR COLORIMETERS AND THE LIKE

Application filed September 2, 1927. Serial No. 217,253.

This invention relates to optical instruments and more particularly it refers to that class of instruments wherein two fields are placed in contiguous relationship for purposes of comparison or matching as to color or brightness, such as in colorimeters or photometers, for example.

One of the principal objects of the present invention is to produce a simple and efficient optical system which will afford convenient means for matching or comparing illuminated areas in a field of view.

Another object is to provide an optical system for instruments of the class described whereby the contiguous areas to be observed will be separated by a sharp dividing line and the rays forming the beams under observation will be subjected to the same conditions in passing through the optical system.

Other objects and advantages reside in certain novel features of construction arrangement and combination of parts, which will be hereinafter more fully described and pointed out in the appended claims.

Referring to the drawings.

Similar reference characters refer to the same parts throughout the several views of the drawings.

Figures 1, 2:
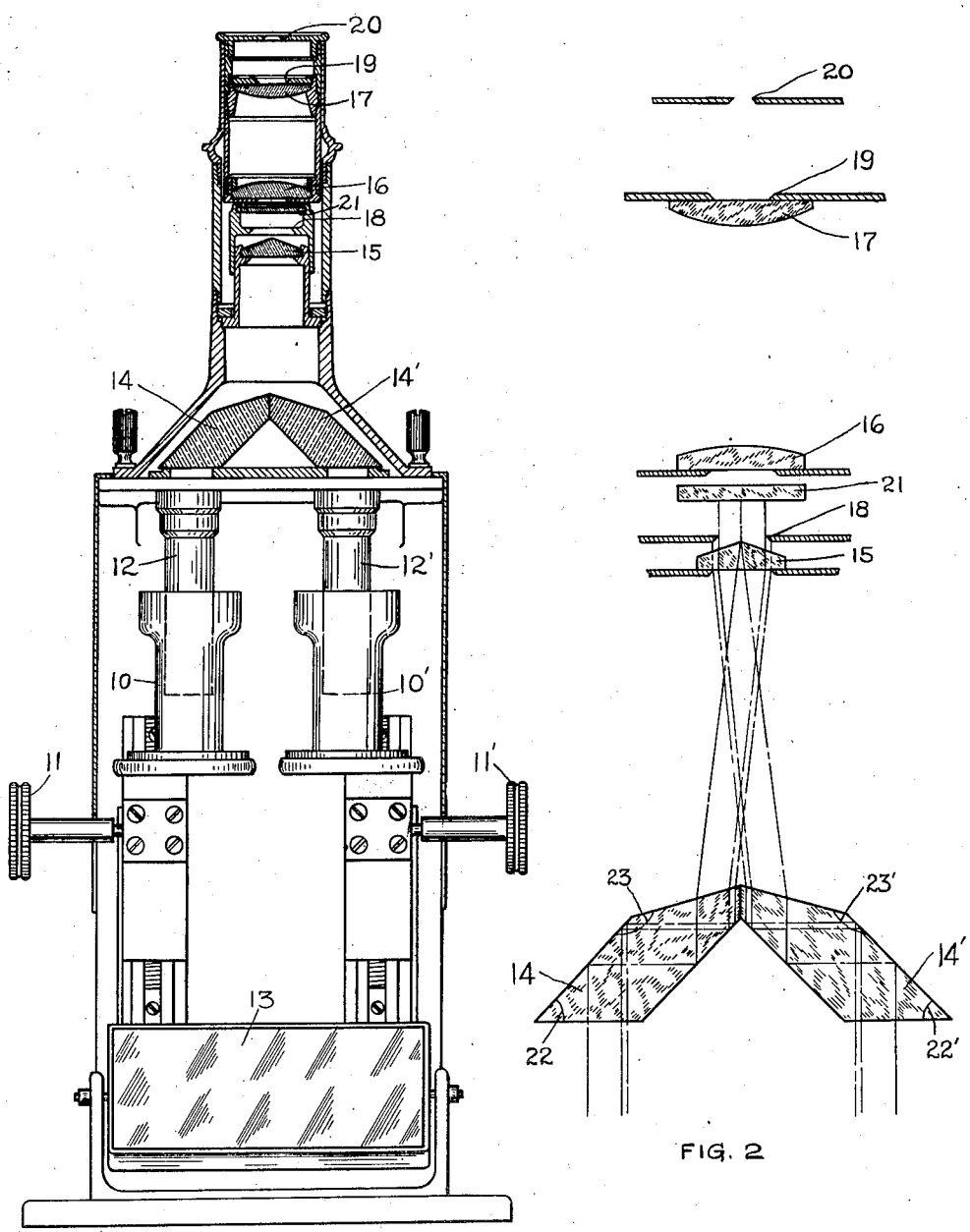
Fig. 1 is a front elevation of a well known form of colorimeter with parts in section to show the application of my improved optical system.
Fig. 2 is a diagrammatic view showing the paths of light rays through the prisms of my optical system.

With instruments such as colorimeters and photometers it is usually desired to match or compare the color or brightness of two separate beams of light. In order to effect this comparison or matching, light rays from the two separate beams are brought into contiguous relationship in a field of view. In using an instrument of this type, the observer makes adjustments or settings so that the two contiguous areas appear to be of a uniform color, in the case of a colorimeter, or a uniform brightness, in the case of a photometer.

To insure accuracy in making settings of such an instrument, it is necessary that the dividing line between the two contiguous areas be as fine as possible so that the two areas may be sharply divided and any overlapping or indefiniteness eliminated. It is also essential, for accurate work, that light rays from the two beams to be compared should be subjected to uniform conditions, as to color and absorption, in passing through the optical system of the instrument.

The optical systems which have heretofore been used in instruments of the class described, have not been entirely satisfactory. Thus, in the form of instrument employing two cemented rhomboid prisms, light rays of one beam pass through the cement layer whereas light rays of the other beam do not pass through the cement layer. This produces a difference in the two light beams, as the light rays will be slightly colored or tinted by passage through the cement layer, thereby introducing errors in colorimetric work where it is necessary to match the color of two contiguous fields. Another form of instrument utilizes two contacting rhomboid prisms with two edges arranged in overlapping relation. In this form, the sharp edge of the upper prism is used as the dividing line between the two fields. This type also presents difficulties, as the sharp edge is not easily produced and when once produced is quite easily broken.

In order to overcome some of the defects of existing instruments, I have devised an improved optical system, a preferred embodiment of which is shown in the drawings. Fig. 1 shows a well known form of colorimeter having glass cups 10, 10', mounted for independent vertical adjustment by means of the adjusting screws 11, 11', and arranged to cooperate with the fixed, downwardly depending glass plungers 12, 12'. A pivotally mounted reflecting device 13 is arranged to direct light rays upwardly and through the bottoms of the glass cups 10, 10'.

The application of my improved optical system to a colorimeter is clearly shown in Fig. 1. The two prisms 14, 14' are of similar structure and have polished angularly disposed surfaces, each prism having only two parallel light reflecting surfaces as shown.

The prisms 14, 14', which are shown in contacting relation, need not be cemented together at the point of contact, but may be held by any suitable clamping device (not shown) cooperating with the sides of the prisms. It is to be understood that it is not necessary that the two prisms be in contact as shown, for the system would function equally well if the two prisms were slightly spaced.

The biprism 15 is mounted above the similar prism 14, 14', as illustrated in the drawings, and cooperates with these prisms to reflect the light rays as shown in Fig. 2. Any suitable ocular may be arranged above the prism system as shown. The ocular which is illustrated comprises two lens members 16 and 17 which function together with the stops or diaphragms 18, 19 and 20. A piece of glass 21, having plane parallel sides, serves as a cover glass to prevent dust from dropping onto the biprism.

In the embodiment of my invention which is illustrated on the drawings, the angles 22, 22' of the prisms 14, 14' are each 45 degrees in magnitude, the angles 23, 23' are each 150 degrees in magnitude, the inclined surfaces of biprism 15 are disposed at an angle of 15 degrees and 30 minutes with the horizontal base, and the lower face of biprism 15 is approximately 42 mm distant from the nearest point of prisms 14, 14'.

Light rays are reflected upwardly by the mirror 13 and after passing through the two plunger and cup units they are normally incident upon the lower horizontally disposed surfaces of prisms 14 and 14'. The light rays are then successively totally reflected by the inclined parallel surfaces, are refracted as they emerge from the prisms 14, 14' and are again refracted by the biprism 15, from which they emerge as parallel rays to be viewed by the ocular. A clear understanding of the successive reflections and refractions may be had by reference to Fig. 2.

The vertex of biprism 15 provides a fine line which sharply divides the rays from the two beams of light. Since the rays are totally reflected by the inclined parallel surfaces of prisms 14, 14', it is not necessary to apply silvering or other reflecting means to these surfaces. As the prisms 14, 14' are each made of a single piece of refracting material, it is evident that I am able to dispense with a cemented structure and hence the difficulties caused by cement layers in the optical path are eliminated.

Although I have shown and described the application of my invention to a colorimeter, it is to be understood that the use of my optical system is not limited to colorimeters, as it can be equally well applied to other instruments wherein it is desired to place a plurality of fields in contiguous relationship as in photometers, for example.

From the foregoing it will be evident that I am able to attain the objects of my invention and provide a simple, yet efficient optical system, for instruments of the class described, which will have the advantages of a sharp dividing line, complete symmetry and freedom from silvered surfaces and cement layers. It is obvious that modifications may be made without departing from the spirit of my invention and it is to be understood that the specification and drawings are to be interpreted as illustrative only, and not in any limiting sense.

I claim:

1. In a colorimeter, an optical system comprising an ocular, two similar prisms and a biprism disposed between said ocular and said similar prisms, each of said similar prisms having a surface disposed to receive light rays normally thereto, two surfaces for successively reflecting said rays and a surface for refracting said rays.

2. In a device of the character described, an optical system comprising an ocular, prisms and a biprism positioned between said ocular and said prisms, each of said prisms having a horizontally disposed light-receiving surface, two parallel reflecting surfaces inclined to the horizontal, and a light emergent surface inclined to the horizontal, whereby light rays normally incident upon said light-receiving surface are successively reflected and then refracted as they emerge from said prisms.

3. A colorimeter comprising plunger and cup units, prisms positioned above said units and adapted to receive light rays which pass through said units, a biprism positioned above said prisms and an ocular located above said biprism to receive light rays which emerge from said biprism.

4. A colorimeter comprising a pair of plunger and cup units, a pair of similar prisms mounted, resepectively, above said units, each of said prisms having a horizontally disposed lower surface, two inclined reflecting surfaces and an inclined upper surface, a biprism positioned above said prisms with its base facing said prisms and an ocular positioned above said biprism.

JOHN W. FORREST.